United States Patent
Ghosh et al.

(10) Patent No.: US 7,466,664 B2
(45) Date of Patent: Dec. 16, 2008

(54) METHODS, APPARATUS, AND PROGRAM PRODUCTS FOR APPLYING A VISIBILITY FUNCTION TO NETWORKED INFORMATION

(75) Inventors: Arpita Ghosh, Mountain View, CA (US); Daniel H Greene, Sunnyvale, CA (US); Qingfeng Huang, San Jose, CA (US); Juan Liu, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 699 days.

(21) Appl. No.: 11/219,234

(22) Filed: Sep. 2, 2005

(65) Prior Publication Data
US 2007/0053307 A1 Mar. 8, 2007

(51) Int. Cl.
*H04L 12/26* (2006.01)
(52) U.S. Cl. ...................................... 370/254
(58) Field of Classification Search ................ 370/254, 370/255, 256
See application file for complete search history.

(56) References Cited

U.S. PATENT DOCUMENTS

| 6,721,537 | B1 | 4/2004 | Briesemeister | |
|---|---|---|---|---|
| 2004/0190528 | A1 | 9/2004 | Dacosta | |
| 2006/0015502 | A1* | 1/2006 | Szucs | 707/9 |
| 2006/0021009 | A1* | 1/2006 | Lunt | 726/4 |
| 2006/0262772 | A1* | 11/2006 | Guichard et al. | 370/351 |
| 2007/0066297 | A1* | 3/2007 | Heidari-Bateni | 455/423 |
| 2007/0140245 | A1* | 6/2007 | Anjum et al. | 370/390 |
| 2008/0109456 | A1* | 5/2008 | Huang et al. | 707/100 |

FOREIGN PATENT DOCUMENTS

WO 2004017226 A2 2/2004

OTHER PUBLICATIONS

D. Bottazzi et al., 'Enabling Context-Aware Group Collaboration in MANETs', Autonomous Decentralized Systems, Apr. 2005, pp. 310-318.*
Bo Xu et al., "Opportunistic Resource Exchange in Inter-vehicle Ad-hoc Networks", Proceedings of the 2004 IEEE International Conference on Mobile Data Management.
Abdelmalik Bachir et al., "A Multicast Protocol in Ad hoc Networks Inter-Vehicle Geocast", 2003 IEEE, pp. 2456-2460.

(Continued)

*Primary Examiner*—Melvin Marcelo
(74) *Attorney, Agent, or Firm*—Park, Vaughan & Fleming LLP

(57) ABSTRACT

The disclosed technology uses a visibility function within a network environment that includes a set of nodes. At least one of nodes can directly transmit to one or more of a subset of the set of nodes. The visibility function characterizes a non-uniform resolution profile within the network environment that extends over at least one node outside the subset of nodes. The sent situation information is conditioned to propagate through the network environment according to the visibility function. The node can also receive situation information that includes a visibility parameter. Once the situation information is received, the node can evaluate the visibility parameter to determine whether the situation information is eligible for continued propagation through the network environment. If situation information is eligible for continued propagation the node then prepares to transmit the situation information.

37 Claims, 6 Drawing Sheets

OTHER PUBLICATIONS

R. Meier & V. Cahill, *Exploiting Proximity In Event-Based Middleware For Collaborative Mobile Applications*, In Proc. Distributed Applications And Interoperable Systems:4th IFIP WG6.1 International Conference, pp. 285-296, 2003.

Hannes Hartenstein et al., *Position-Aware Ad Hoc Wireless Networks For Inter-Vehicle Communications: The Flleetnet Project*, In Proc. ACM Symposium On Mobile Ad Hoc Networking And Computing, pp. 259-262, 2001.

Robert Morris et al., *CarNet: A Scalable Ad Hoc Wireless Network System*, In Proc. 9th Workshop On ACM SIGOPS European Workshop, pp. 61-65, 2000.

Lars Wischhof et al., Adaptive Broadcast For Travel And Traffic Information Distribution Based On Inter-Vehicle Communication, *In Proc. ACM Intelligent Vehicle Symposium, IEEE*, 2003.

Jing Tian et al., *Spatially Aware Packet Routing For Mobile Ad Hoc Inter-Vehicle Radio Networks*, In Proc. ITSC. IEEE, 2003.

Jean-Pierre Hubaux et al., *The Security And Privacy Of Smart Vehicles*, In Security And PLrivacy Magazine, vol. 2(3), undated.

Magda El Zarki et al., *Security Issues In A Vehicular Network*, In European Wireless, 2002.

Philippe Golle et al., *Detecting And Correcting Malicious Data In VANETs*, In Proc. ACM VANET'04, 2004.

M.T.J. Hedrick et al., *Control Issues In Automated Highway Systems*, In IEEE Control Systems Magazine, vol. 14(6), pp. 21-32, 1994.

L. Briesemeister et al., *Disseminating Messages Among Highly Mobile Hosts Based On Inter-Vehicle Communications*, In Proc. IEEE Intelligent Vehicles Symposium, Oct. 2000.

Jijun Yin et al., *Performance Evaluation Of Safety Applications Over DSRC Vehicular Ad Hoc Networks*, In Proc. ACM VANET'04, Oct. 2004.

Joachim Wale, *Information In Intelligent Transportation Systems*, In Ph.D. Thesis, Jan. 2002.

L.B. Michael, *Adaptive Layered Data Structure For Inter-Vehicle Communication In Ad Hoc Communication Networks*, In Proc. 8th World Congress On Intelligent Transportation, 2001.

* cited by examiner

METHODS, APPARATUS, AND PROGRAM PRODUCTS FOR APPLYING A VISIBILITY FUNCTION TO NETWORKED INFORMATION

BACKGROUND

1. Field

The disclosed technology relates to the field of networking.

2. Background

The potential of important applications such as emergency warning systems, collision avoidance, traffic monitoring, route planning, and many others have instigated significant research on vehicular ad hoc networks (VANETs) and intelligent transportation systems based on VANETs.

Two early large projects on large wireless ad hoc networks are CarNet and Fleetnet, discussed by R. Meier and V. Cahill, see "Exploiting proximity in event-based middleware for collaborative mobile applications," in *Proc. Distributed Applications and Interoperable Systems: 4th IFIP WG6.1 International Conference*, pages 285-296, 2003; and by H. Hartenstein et al., see "Position-aware ad hoc wireless networks for inter-vehicle communications: The fleetnet project," in *Proc. ACM Symposium on Mobile ad hoc networking and computing*, pages 259-262, 2001.

Routing protocols for VANETs have been disclosed, for example, by R. Morris et al., see "Carnet: a scalable ad hoc wireless network system," in *Proc. 9th workshop on ACM SIGOPS European Workshop*, pages 61-65, 2000; Hartenstein et al. (previously cited); L. Wischhof et al., see "Adaptive broadcast for travel and traffic information distribution based on intervehicle communication," in *Proc. Intelligent Vehicle Symposium*, IEEE, 2003; and by J. Tian et al., see "Spatially aware packet routing for mobile ad hoc intervehicle radio networks," in *Proc. ITSC. IEEE*, 2003.

Security issues in VANETs have been disclosed, for example, by J. Hubaux et al., see "The security and privacy of smart vehicles," in *Security and Privacy Magazine*, volume 2(3); M. E. Zarki et al., see "Security issues in a future vehicular network," in *European Wireless*, 2002; P. Golle et al., see "Detecting and correcting malicious data in VANETs," in *Proc. ACM VANET'04*, 2004; and control issues are discussed by M. T. J. Hedrick et al., see "Control issues in automated highway systems," in *IEEE Control Systems Magazine*, volume 14(6), pages 21-32, 1994.

VANET safety applications have been disclosed, for example, L. Briesemeister et al., see "Disseminating messages among highly mobile hosts based on inter-vehicle communications," in *Proc. IEEE Intelligent Vehicles Symposium*, October 2000; J. Yin, et al., see "Performance evaluation of safety applications over DSRC vehicular ad hoc networks," in *Proc. ACM VANET'04*, October 2004; Route planning and transportation are discussed by J. Wahle, see "Information in intelligent transportation systems," in *Ph.D. Thesis*, January 2002.

The issue of proximity based data dissemination has been discussed (by R. Meier and V. Cahill, see "Exploiting proximity in event-based middleware for collaborative mobile applications," in *Proc. Distributed Applications and Interoperable Systems: 4th IFIP WG6.1 International Conference*, pages 285-296, 2003), teaching an architecture that allows proximity based subscription to information based on proximity where different applications can subscribe to information within different distances. However, the possibility of a fractional amount of information reaching a destination is not disclosed. The idea of layered data dissemination is discussed by L. B. Michael (see "Adaptive layered data structure for inter-vehicle communication in ad hoc communication networks," in *Proc. 8th World Congress on Intelligent Transportation*, 2001) that was motivated by a proximity-based need for information in different applications. Using Michael's data structure, packets are transmitted with layers of data which are successively removed from the data structure as the information travels further from the source. A disadvantage to this approach is that it prohibits the possibility of fractional information of any form different from that present in the layered data structure. Moreover, neither Meier and Cahill nor Michael quantifies the need for variable resolution information based on proximity to the source of the information.

It would be advantageous to provide a protocol that addresses the needs of proximity based applications and that does not have the previously described limitations.

DESCRIPTION OF THE PREFERRED EMBODIMENTS

Figure 1:
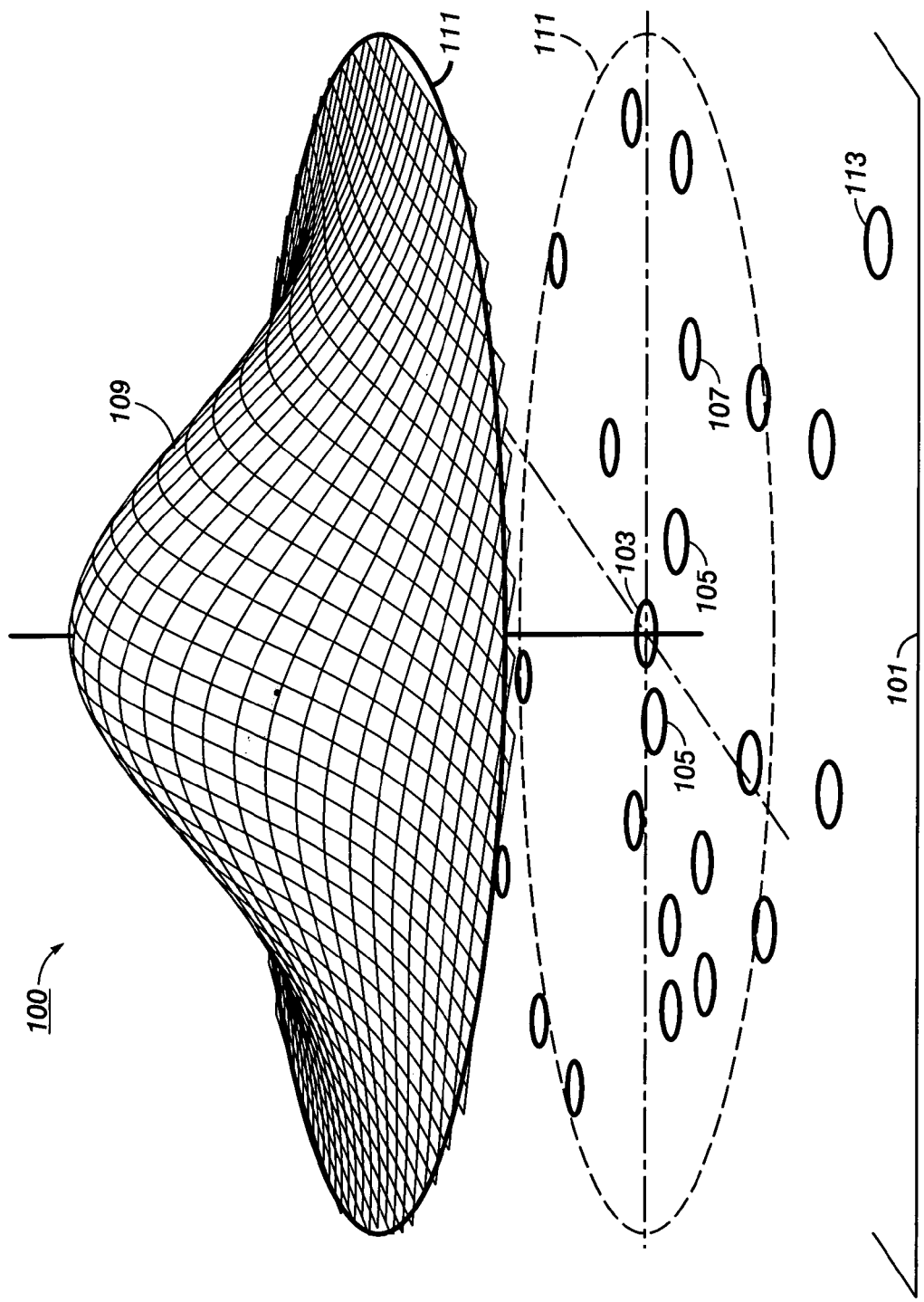
FIG. 1 illustrates a network environment and a resolution profile that resulted from a visibility function where the resolution profile is circular.

The technology disclosed herein teaches methods, apparatus, and program products that use a visibility function in a network environment that includes a set of nodes. At least one of nodes is able to directly transmit to one or more of a subset of the set of nodes. The visibility function characterizes a non-uniform resolution profile within the network environment that extends over at least one node outside the subset of nodes. The method sends situation information that is conditioned to propagate through the network environment according to the visibility function.

The disclosed technology also teaches methods apparatus, and program products that receive situation information by one of the nodes in a network environment. The situation information includes a visibility parameter that is responsive to a visibility function. The visibility function characterizes a resolution profile within the network environment. Once the situation information is received, the node evaluates the visibility parameter to determine whether the situation information is eligible for continued propagation through the network environment. If the situation information is eligible for continued propagation the node then prepares to retransmit the situation information.

The inventors have recognized a need to efficiently propagate situation information through a portion of the network environment while minimizing the usage of network capacity. The inventors have also recognized that, for many applications, the required or desired "resolution" of the data can vary with propagation distance from the source node of the situation information.

In many applications, the requirement on information resolution (for example, with respect to both the granularity and the precision resolution characteristics) varies with distance, with near nodes requiring more precise and timely information from each other than do far nodes. In these applications, near-range information is more relevant to immediate decisions than is information from more distant source nodes. For some applications, the resolution of the information indicates the amount of detail in the information (for example, where a high resolution temperature reading indicates a temperature value of 100 degrees, the lower resolution temperature information would simply be "Hot"). For other applications the resolution of the situation information can be a function of size of the data field (thus the precision of the information) used to hold the situation information. In still other applications, the resolution of the information can be the timeliness or granularity of the information (closer nodes need more current information than do further nodes and so the closer nodes need a finer granularity than do farther nodes). For some applications, multiple source nodes at the same approximate location can send similar situation information (for example, environmental information). The resolution at any particular node can be a result of averaging (or otherwise combining) situation information received from multiple sources, from multiple situation information updates from a single source, or some combination thereof. The resolution can also depend on the number of situation information updates that have been received. Thus, multiple updates tending toward an inference have higher resolution than an inference supported by a single occurrence of the situation information. Some applications can have an information resolution that is a combination of these characteristics, as well as other characteristics not described herein.

For example, a collision avoidance application only requires that alarm information (for example, airbag deployment, hard braking information, etc.) propagates through the network environment for a short distance. This application also requires that the alarm information be precise and timely. This information must be received by the vehicles near the source vehicle because these vehicles only have a small amount of time to respond to the source vehicle's alarm information. However, this alarm information is less important to vehicles at a further distance from the source vehicle because these vehicles have much more time to respond to the alarm information than do the near vehicles.

In another example, a vehicle's operator may invoke a traffic planning application that uses information such as road, weather, and/or traffic conditions within a metropolitan area. In such applications, variable-resolution information from the metropolitan area is sufficient (with resolution decaying with distance from the vehicle).

To fulfill the needs of these applications (as well as others), the inventors have developed the concept of "visibility." Visibility is used to quantify the variable-resolution requirement for information usage. The inventors have used probabilistic schemes to achieve a visibility for a variable-resolution information dissemination (VRID) protocol. In addition, the inventors have determined that there is a relationship between the value (the utility) of the propagated situation information and the visibility for the situation information. This relationship can help an application designer determine the appropriate visibility for particular types and/or uses of situation information. A visibility function defines a resolution profile over the entirety of, or a portion of the network environment. The resolution profile indicates the resolution of the information, which originated from a source node, at a receiving node located at some distance from the source node.

Variable-resolution information dissemination is a new type of the one-to-many (multicast) information dissemination paradigm. VRID differs from conventional information dissemination techniques such as IP multicast, geocast, and mobicast because the resolution profile is not a uniform 100% over the receiving nodes. While VRID can emulate IP multicast, geocast, and mobicast when the visibility is 100% for the set of expected recipients, its primary use is in providing variable-resolution information.

VRID can be used to disseminate situation information to multiple recipients throughout the network environment. This differs from typical point-to-point communication in the sense that the goal is not to transport information to any specific node, but rather to spread information so that nodes can be aware, to some extent, about what is happening in the network environment.

Compared to broadcasting, variable-resolution information dissemination uses significantly less communication bandwidth, which is a scarce resource in the network environment (and especially scarce in ad hoc wireless networks).

Variable-resolution information dissemination can be used to address the following:

VRID can satisfy the situation where the value of information from a source node is a function of distance from the source node. For example, in many real-world applications, information has a well-defined value ("Utility") that is a function of distance from the source of the information. For example, for a vehicle-to-vehicle collision warning application, the location and velocity information and the immediacy of the information of a specific vehicle has a high utility for its neighboring vehicles. However, this information is less useful (has a lower utility) to vehicles further away from the specific vehicle; and this information has no value to vehicles on the other side of the earth. Furthermore, vehicles neighboring the specific vehicle may need high resolution information (for example, information that includes precise and timely location and velocity data). However, vehicles further away from the specific vehicle are likely to tolerate lower resolution information.

VRID uses less of the available network environment capacity as high resolution information is not sent to each node in the network environment. Instead, variable-resolution information is provided according to the resolution profile, thus reducing the use of the network environment's capacity.

VRID allows different applications to use similar situation information differently. For example, information granularity requirements can differ from application to application—an exit-aware lane-switching advisory system requires timely (fine granularity) and precise location and velocity information from all vehicles within some reasonably limited distance of the exit, while a peer-to-peer cooperative traffic monitoring system might only need location and velocity information from a vehicle at every half kilometer interval at a very low update frequency (thus, the resolution for this information would have a course granularity characteristic).

VRID allows grouping of situation information that have similar resolution profiles into a situation information group. The usage of the network environment's capacity (as well as other resource usage) can be reduced because VRID can accumulate situation information from multiple applications and organize that information into situation information groups for transmission. On receipt of an update packet containing a situation information group, VRID can serve the situation information within the groups to the appropriate applications. Thus, each application need not independently run their own dissemination and data collection protocols.

VRID enables the use of the information's utility to determine a resolution profile. This simplifies the programmer's task in determining the visibility function.

Variable-resolution information dissemination uses the concept of a visibility function that that specifies a resolution profile that represents the extent the situation information originating from a source node is 'visible' in the network environment. For example, imagine a network along a one dimensional line $x \in R$. The visibility function $V(x)$ could take a value in the interval $[0, 1]$, and specifies the "resolution" of information from the source node (assumed to be at x=0) that is maintained at location x.

FIG. 1 illustrates a network environment 100 within which embodiments of the disclosed technology can operate. The network environment 100 includes a set of nodes 101 (in FIG. 1 and FIG. 2 each node is illustrated by a circle projection) that can potentially share situation information. One of the set of nodes 101 is a source node 103 that can transmit situation information for variable-resolution propagation throughout the network environment. The source node 103 transmission can directly reach a neighbor node 105, but can not directly reach a non-neighbor node 107 (the non-neighbor node 107 receives the information from one of its neighbor nodes that has retransmitted the situation information that originally was sent by the source node 103). Situation information can be provided by a data source such as a sensor, a processor, a logic, a circuit, etc, and can be provided in raw or processed forms.

Some of the transmitted situation information may be subject to variable-resolution information dissemination while other of the transmitted situation information may not be subject to variable-resolution information dissemination (and thus, uses network environment capacity to propagate the situation information to all of the set of nodes 101).

Situation information subject to variable-resolution information dissemination propagates through the set of nodes 101 in accordance with a resolution profile defined by the visibility function (for example, a circular resolution profile 109) that represents the "resolution" of the situation information at each node in the network environment 100.

In one embodiment, the visibility function limits the propagation of the situation information to a propagation distance boundary 111. Thus, nodes outside the propagation distance boundary 111 that receive the source node's situation information will not retransmit the situation information (for example, an extraneous node 113 will not retransmit situation information sourced from the source node 103 because the extraneous node 113 is outside the propagation distance boundary 111. One skilled in the art will understand that for some types of situation information/application combinations, the propagation distance boundary 111 can be far from the source node 103, while for other types of situation information/application combinations, the propagation distance boundary 111 can be near the source node 103. Yet other embodiments allow low resolution situation information to propagate to all the nodes in the network environment (thus, no node is extraneous).

Figure 2:
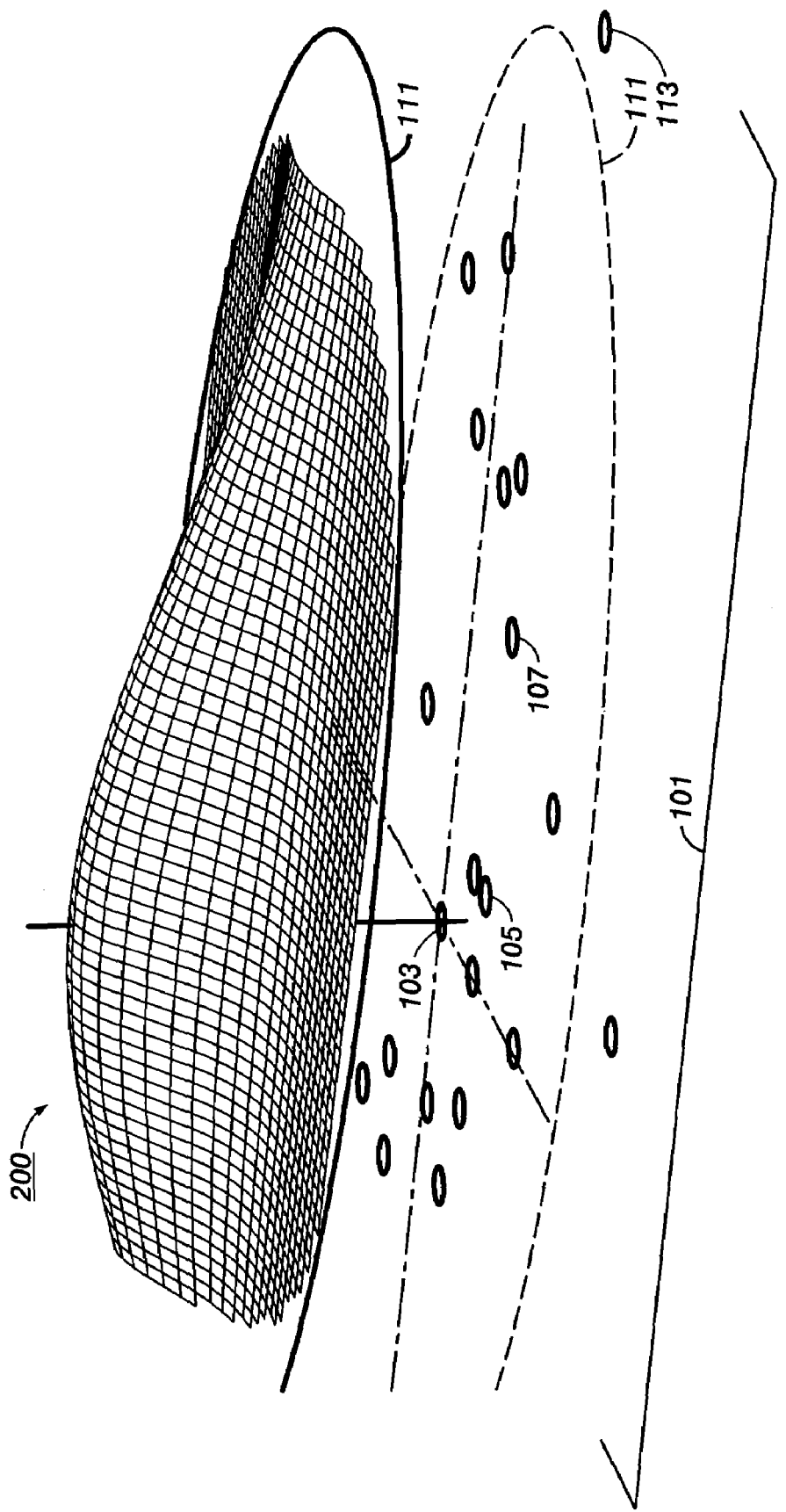
FIG. 2 illustrates a network environment and a resolution profile that resulted from a visibility function where the resolution profile is elliptical.

FIG. 2 illustrates a network environment 200 that has an elliptical resolution profile 209. Such a profile would be useful, for example, for a collision avoidance application along a substantially linear portion of a roadway.

In one embodiment, the resolution profile is achieved by the source node 103 periodically sending updated situation information, where each update packet contains a visibility parameter (in accordance with the visibility function) such as a propagation distance component that specifies the propagation distance from the source the update packet is to be propagated. Once the update packet reaches a node that is beyond the distance specified by the propagation distance component it will not be retransmitted by that node. Each update packet that is sourced can have a different value for the propagation distance component such that the resolution of the situation information provided via the update packets over time matches the resolution profile. In another embodiment, the resolution profile can be achieved by including visibility parameters in the transmitted situation information to allow each forwarding node to apply the visibility function using the supplied visibility parameters to determine whether to continue propagation of the situation information and/or whether to reduce the precision of the information contained in the update packet.

The propagation distance from the source node 103 can be a geographical distance (in which case, some amount of physical coordinate data—and, in some embodiments, time data—of the source node 103 is included within the update packet). In some embodiments, the propagation distance component can be specified using a "hop count".

Thus, the visibility function specifies how situation information is propagated through a portion of the network environment as well as the situation information's resolution throughout the network environment. While one embodiment disclosed herein uses a spherically symmetric visibility function that is monotonically decreasing, the techniques described herein can be extended by one skilled in the art without undue experimentation to other visibility functions.

The visibility function can apply to situation information that is sent, for example but without limitation, within an update packet that can include vehicle state information (such as position, velocity, engine temperature, control or accessory state, fuel, etc.) and/or environmental information (such as temperature, humidity, state of the roadway surface, etc.); event occurrence information sent in an event packet (such as air bag deployment, wheel slippage, etc.), and any other information that can be provided by one or more sensors, whether measured, processed, aggregated, inferred, and/or derived. Event information can include event-start, event-update, and event-end information.

In one embodiment, the visibility function $V(x)$, can be defined for example, as the percentage of packets that reach a destination at distance x. In this embodiment all update packets containing situation information are equally important to the relevant applications. The visibility function can be defined from the viewpoint of the source node 103 (for example, the source node 103 determines the resolution profile for particular situation information and how the resolution should vary—for example, whether the resolution varies by precision, by granularity, etc), from the viewpoint of an application (for example, airbag deployment may have a governmentally-mandated resolution profile), or the application using the situation information may have a particular Utility and may specify the visibility function using an information utility function (as is subsequently described).

Many methods can be used to achieve the visibility function $V(x)$. In an environment where a single source provides situation information via repeated transmission of update packets, the source can apply the visibility function to determine the propagation distance and resolution components for each update packet such that the combined propagation of the update packets fall within the visibility function constraints and thus, over time produces the desired resolution profile. In an embodiment where multiple sources are providing update packets for an application, each of the sources can independently specify the propagation distance in accordance with the visibility function.

The source can include visibility parameters within the update packet and can transmit update packets without regard to the propagation distance. These packets would then be probabilistically propagated by the receiving nodes responsive to the visibility parameters within the individual update packets. The propagating node can also reduce the precision of the situation information contained within the update packet responsive to the visibility parameters. Some embodiments can allow for one, the other, or both types of transmission.

In some embodiments, the source node can select a distance $x_c$ to which the update packet will travel for each update packet (the update packet is not retransmitted by the first node with $\|X\| > x_c$, where $\|x\|$ is the distance of that node from the source node). In these embodiments, the source node determines the distribution $p_d(x)$ and selects a distance (responsive to the distribution) for each update packet in order to achieve the desired resolution profile.

In some VRID embodiments, if a node at distance $x_c$ receives a message, all nodes at a distance less then or equal x must also receive the message; in this circumstance the visibility function is constrained to be a monotonically decreasing function.

In these embodiments, because all nodes at a distance less or equal to $x_c$ receive the message when $x_c$ is chosen (with probability $p_d(x_c)$), the probability that a node at distance x gets the message is:

$$\int_x^\infty p(x)\,dx$$

Therefore:

$$1 - v(x) = \int_0^x p(x)\,dx.$$

If v is decreasing and differentiable, then setting $p(x)=-v'(x)$ satisfies the above. Therefore, the distribution of distances up to which to send each update packet is $p_d(x)=-v'(x)$. If v is a staircase function, di, the distance at end of interval i, can be selected with a probability of $v_i - v_{i+1}$.

This visibility function scales to n dimensions. This visibility function is not affected by multipath routing because each node simply ignores multiple copies of the same update packet.

In mobile ad hoc networks, VRID needs to accommodate the well-known broadcast storm problem. A broadcast storm happens when nodes flood update packets over an ad hoc network. The resulting congestion causes nodes to delay propagating the update packet, and the delaying node eventually transmits the update packet long after the useful life of the information in the update packet.

There are many approaches to solving the broadcast storm problem. Some embodiments combine the visibility function with "gossip-style" anti-storm algorithms. A node using these anti-storm algorithms that has received a new update packet does not always retransmit the update packet, but rather the receiving node listens to the broadcasts of neighboring nodes; if the same update packet is overheard a predetermined number of times (the "gossip-count") then the update packet is not propagated by the receiving node. The visibility function also can be used with other anti-storm and/or propagation techniques. The gossip-count can be considered a broadcast storm control parameter.

Using an anti-storm algorithm generally implies that some nodes will not receive the update packet because of accidental loss of the update packet. This packet loss is a function of a network characteristic such as the node density (including neighbor nodal density as well as the nodal density throughout the network environment). Accidental update packet loss alters the achieved resolution profile from that specified by the visibility function.

Accidental packet loss can be represented as a 'packet loss' visibility function, $V_f$. For example uniform packet loss in a linear strip environment results in a 'packet loss' visibility function of $v_f(x)=e^{px}$. One skilled in the art will be able to determine $V_f$ for environments other than the linear strip environment without undue experimentation.

One embodiment allows the visibility function to be corrected for accidental update packet loss by using a 'packet loss' visibility function appropriate for the network environment. Thus, in the linear strip environment, the pre-corrected visibility function:

$$v_c(x) = \frac{v_t(x)}{v_f(x)}$$

adjusts the desired visibility function $v_t$ to accommodate the expected loss of update packet's and thus to achieve the desired resolution profile. The visibility function can be adjusted by a visibility adjustment logic that is responsive to a network characteristic (for example, local nodal density).

The inventors have also realized that update packet loss can be compensated for by adjusting the gossip-count (or equivalent broadcast storm control parameters in other anti-storm algorithms). In network environments that have a network characteristic (for example, time variant nodal densities as in VANETs), each node can sample their neighbor nodal density and adjust their gossip-count accordingly (neighbor nodes are those within the direct communication range of the given node). In some embodiments the neighbor nodal density determination can extend to non-neighbor nodes. This adjustment can be done in accordance with:

$$gc(d) = C_1 e^{\left(\frac{c_2}{d}\right)}$$

where: gc is the gossip-count, d is the neighbor nodal density, and the constants are determined from real or modeled environments. The above gossip-count function is but one of many that can be used to adjust the gossip-count as a function of neighbor nodal density by increasing gc(d) in less dense areas. Many of the other anti-storm algorithms can be adjusted to compensate for update packet loss using similar techniques.

Thus, the gossip-count can be varied to make the system more robust against variation in neighbor nodal density. The gossip-count can also be varied to reduce the use of the network environment capacity.

Because network traffic is roughly linearly dependent on gossip-count, gossip-count should be "well spent," that is, the gossip-count should be high (thus, the packet is more likely to be retransmitted by the receiving node) for update packets that still have large distances to propagate (because dropping such an update packet has a potentially significant impact on the information being known throughout the network environment). More precisely, gossip-count can be dynamically adjusted, based on the remaining distance an update packet has to propagate, to equalize the marginal reduction in failure rate per gossip-count. Thus the gossip-count related to a particular update packet, $gc_p$, can be a function of the remaining distance the update packet is to propagate and, in one embodiment, can be expressed as:

$$gc_p(r) = C_1 - C_2 \log(1/r).$$

One skilled in the art will understand that $gc_p$ is just one of many possible functions that can be used to adjust the gossip-count based on the distance the update packet has yet to travel. The constants can be determined from real-world measurements or from modeling the network environment. The constants can be selected responsive to the nodal environment at the time the update packet is to be retransmitted.

Using a dynamically adjusted gossip-count can reduce traffic and reduce in-transit loss (in one model, the traffic was reduced by 15% and with a reduction in update packet loss). As previously discussed, one can pre-correct the visibility function to remove the effects of update packet loss.

The visibility function depends on the application and/or the type of situation information that is being propagated. For example, the shape of the resolution profile is very different for an emergency alert application as compared to a route planning application. One method that can be used to determine the visibility function is to experiment with (or model) different parameters and heuristically select an appropriate visibility function for the application. One can also determine the visibility function by modeling the information need of an application in terms of an information utility function and determining the visibility function from the information utility function.

Figure 3:
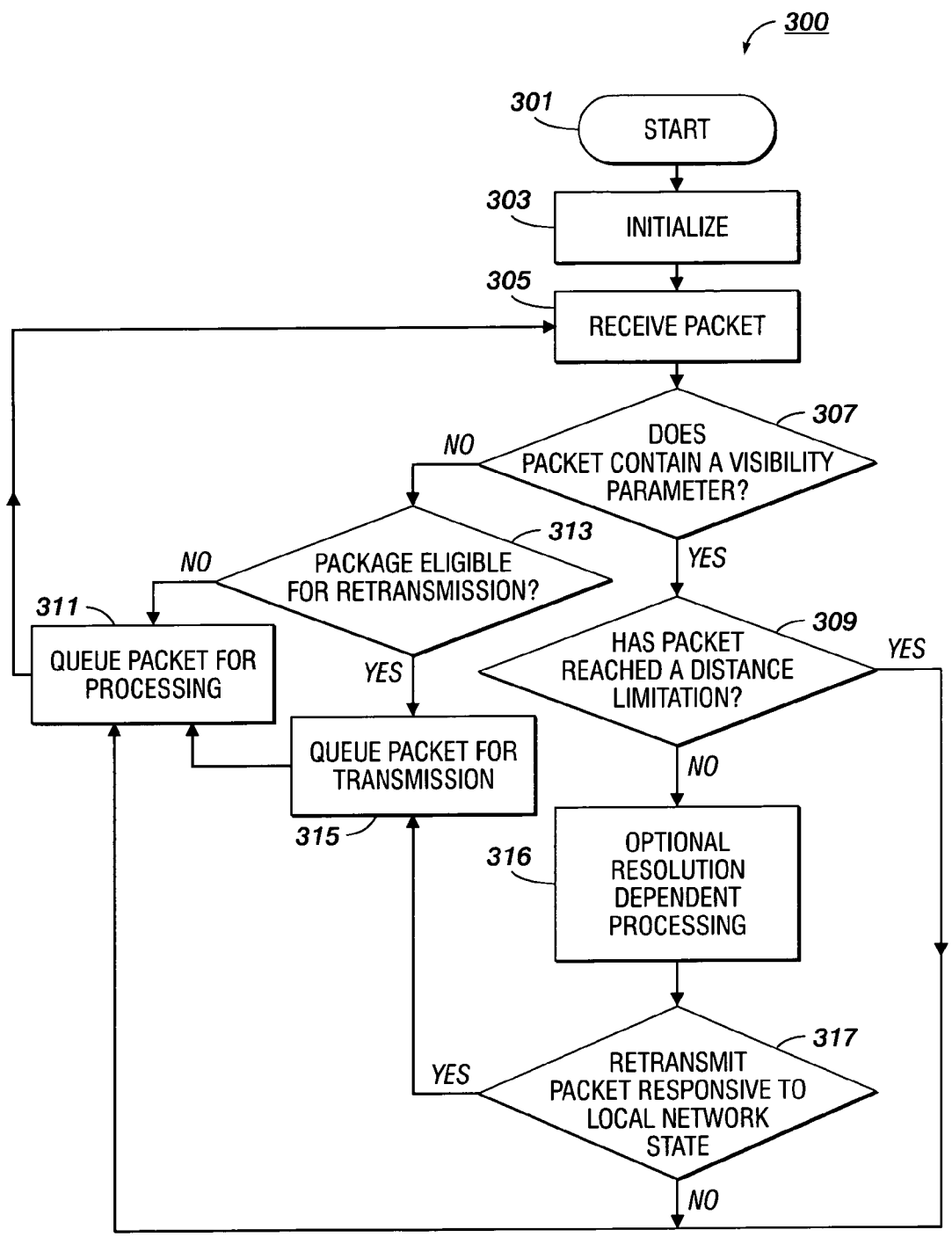
FIG. 3 illustrates operation of a device that utilizes the visibility function.

FIG. 3 illustrates a transmit/receive process 300 that can be used by a node in a network environment to implement the previously discussed concepts. The transmit/receive process 300 initiates at a 'start' terminal 301 in response to the detection of power and/or of a reset signal and continues to an 'initialization' procedure 303 that performs any required initialization. Next, the transmit/receive process 300 continues to a 'receive packet' procedure 305 that receives a packet of information (for example, an update packet) using techniques well known to one skilled in the art. Once the packet of information is received, the transmit/receive process 300 continues to a 'visibility enabled packet' decision procedure 307 that determines whether the packet of information includes a visibility parameter. If so, the transmit/receive process 300 continues to a 'distance limitation' decision procedure 309 that uses the visibility parameter data to determine whether the packet of information (or a situation information group within the packet of information) should continue to propagate through the network environment. If the packet of information has reached or exceeded its propagation distance, the transmit/receive process 300 continues to a 'queue packet for processing' procedure 311 that queues the packet of information for subsequent processing of the situation information it contains. Then the transmit/receive process 300 returns to the 'receive packet' procedure 305 to process the next received packet of information. In some embodiments the packet of information need not be queued for processing, but can be immediately processed. As such the data processing logic can include queuing logic, statistical logic, analysis logic, diagnostic logic etc.

If at the 'visibility enabled packet' decision procedure 307, the packet of information does not include the visibility parameter, the transmit/receive process 300 continues to a 'retransmit packet' decision procedure 313 that determines whether the packet of information is eligible for retransmission. If the packet of information is not eligible for retransmission (such as by operation of an anti-storm algorithm), the transmit/receive process 300 continues to the 'queue packet for processing' procedure 311 that queues the packet of information for subsequent processing of the situation information it contains. Then the transmit/receive process 300 returns to the 'receive packet' procedure 305 to process the next received packet of information.

However, if at the 'retransmit packet' decision procedure 313, the packet of information is eligible for transmission, the transmit/receive process 300 continues to a 'queue packet for transmission' procedure 315 that that queues the packet of information for retransmission and the transmit/receive process 300 continues to the 'queue packet for processing' procedure 311 that queues the packet of information for subsequent processing of the situation information it contains. Then the transmit/receive process 300 returns to the 'receive packet' procedure 305 to process the next received packet of information. In some embodiments the packet of information is not queued for transmission, but is immediately transmitted. As such the transmission preparation logic can include queuing logic, collision logic, time-slot logic etc.

If at the 'distance limitation' decision procedure 309, the packet of information has not reached its propagation distance, the transmit/receive process 300 continues to an 'optional resolution processing' procedure 316 that can, responsive to the visibility parameter, adjust one of the resolution characteristics of the information contained in the packet of information or in a situation information group (for example, the precision of the data values in the situation information can be reduced).

Next, the process continues to a 'retransmit visibility enabled packet' decision procedure 317 (that can contain retransmission evaluation logic) that evaluates whether the packet of information is to be retransmitted taking into account the current state of the network environment in proximity to the device performing the transmit/receive process 300. If the packet of information (or situation information group) is to continue propagating, the transmit/receive process 300 continues to the 'queue packet for transmission' procedure 315 for subsequent retransmission and processing as has been previously described. However, if the state of the local network environment is such that the packet of information need not be retransmitted, the transmit/receive process 300 continues the 'queue packet for processing' procedure 311 for processing as has been previously described.

One skilled in the art will understand that the embodiment of FIG. 3 can be reduced to a more simplified embodiment. For example, if all the information packets include a visibility parameter then the 'visibility enabled packet' decision procedure 307 is no longer required. Further, such a one will understand that if the 'optional resolution processing' procedure 316 is omitted, that the 'distance limitation' decision procedure 309 can communicate directly with the 'queue packet for transmission' procedure 315 or the 'retransmit visibility enabled packet' decision procedure 317 depending on the capability desired of the transmit/receive process 300. Further, such a one will understand that in some embodiments the 'queue packet for processing' procedure 311 and the 'queue packet for transmission' procedure 315 can be replaced by the actual processing procedure and transmission procedure respectively. Other simplifications result in further embodiments all of which are taught by the embodiment shown in FIG. 3.

Because the packet of information distributed using VRID is generally not propagated completely throughout the network environment, the network capacity that would be used for such propagation is saved and can be used for other communications.

One skilled in the art will understand how to make use of the packet of information once it is queued by the 'queue packet for processing' procedure 311, how to retransmit the packet of information after it is queued by the 'queue packet for transmission' procedure 315, and how to release resources once the packet of information is retransmitted and/or processed.

The 'retransmit visibility enabled packet' decision procedure 317 evaluates whether to retransmit the packet of information (or situation information group) based on the local network environment state. Using nodal density determination logic, the node can sample its neighbor nodal density (not shown) and can adjust the gossip-count to reduce the local network traffic and to accommodate changes in the neighbor nodal density.

A source node can also request information from the network environment by transmitting an information probe request that includes a visibility parameter and a situation information query. Such a request from a source node can cause the requested information to be updated to all nodes within some distance of the source node. For example, if the source node determines that it needs to update its neighbor nodal density information, the source node can transmit an information probe request having a visibility parameter that is responsive to a visibility function that defines a resolution profile that is limited to neighbor nodes (thus, the information probe request only impacts the network capacity of neighbor nodes and does not directly impact non-neighbor nodes).

The situation information query can contain the address of the source node and/or an identifier for the requested information. When a node (a response source node) receives a packet of information containing the situation information query, it propagates the packet of information as previously described, generates a query response packet that includes the requested information responsive to the situation information query and that includes, for example, a copy of the visibility parameter(s) from the information probe request that was issued by the source node (instead of the visibility parameter (s) that would be used by the response source node), a modified copy of the visibility parameter(s) from the information probe request (modified, for example, responsive to the situational awareness of the response source node (for example its neighbor nodal density)) or, if the visibility parameter(s) provided by the source node represent a visibility function that is not symmetric, visibility parameter(s) that represent a transformed copy of the visibility function used by the source node (such as rotated by 180 degrees and/or translated to the origin of the response source node), and transmits the query response. The source node eventually receives the query response (which contains the requested information) but does not propagate the query response because the source node is configured to recognize the response to the situation information query. A neighbor node in range of the responding node only propagates the query response if the neighbor node would have propagated the information probe request from the source node because the query response contains the same visibility parameter(s) as the situation information query. This usage of the visibility function again conserves communication capacity as neither the situation information query nor the query response is propagated throughout the network environment.

The adjusted, transformed and/or rotated visibility parameter(s) are used to make certain that the source node will receive the query response while still limiting the propagation of the query response.

Some embodiments have situation information organized into situation information groups such that the determination of whether to propagate all the situation information (including information from different applications and/or different nodes) within a particular situation information group can be made once for the situation information group instead of made for each situation information in the group. Multiple situation information groups can be included in a single packet of information. One skilled in the art will understand, after reading the disclosed technology, how to combine situation information groups into a packet of information, how to remove situation information groups that are not to be retransmitted from the packet of information, how to separate and distribute situation information from a situation information group, etc. A packet of information that contains one or more situation information groups is an aggregation packet. In another embodiment, situation information is combined within a packet of information without any attempt to find commonality in the visibility parameters of the situation information. This allows a larger packet to be sent instead of individual packets for each situation information.

Figure 4:
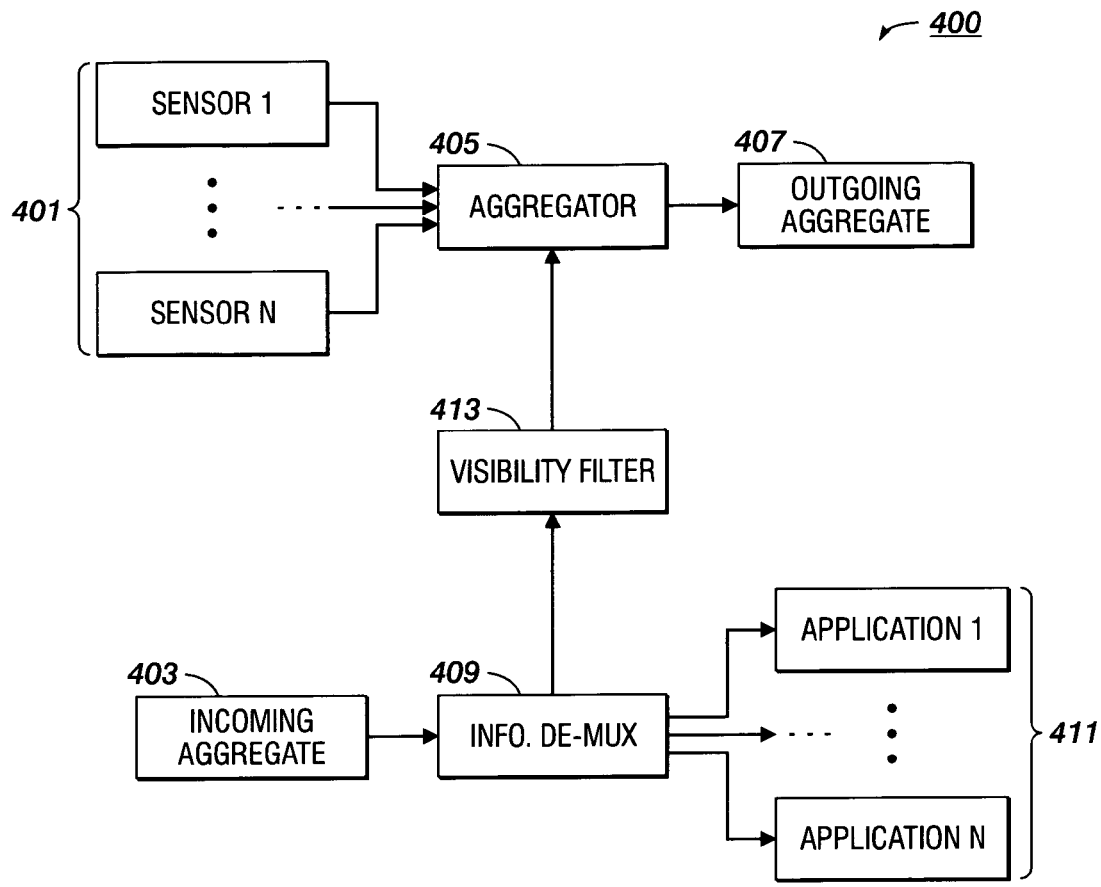
FIG. 4 illustrates aggregation architecture in accordance with one embodiment.

FIG. 4 illustrates an aggregation architecture 400 for propagating situation information contained in an aggregation packet (for example within a sensor-equipped vehicle). Information can be received from a 'set of sensors' 401 (or other data source) and/or from the network via an 'incoming aggregate packet' 403. The sensor information flows to an 'situation information aggregator' 405 that applies visibility parameters to each separate sensor reading (or to each group of sensor reading that have the same visibility parameters), assembles the sensor situation information into situation information groups (along with other subsequently discussed situation information) that, in turn, can be assembled into an 'outgoing aggregate packet' 407 for transmission to the network environment. The 'situation information aggregator' 405 can include a visibility assignment logic.

The situation information groups in the 'incoming aggregate packet' 403 can be separated by a 'situation information demux' 409 and distributed to a 'set of applications' 411 for subsequent processing. The situation information groups (or, in some embodiments, the complete 'incoming aggregate packet' 403) also can be provided to a 'visibility filter' 413 that examines each situation information group contained in the 'incoming aggregate packet' 403 and processes the situation information group substantially as described in FIG. 3 with respect to the 'visibility enabled packet' decision procedure 307, the 'distance limitation' decision procedure 309, and the 'retransmit visibility enabled packet' decision procedure 317. Situation information groups that do not have a visibility parameter, as well as the situation information groups that are to continue propagation are then included in the 'outgoing aggregate packet' 407.

One skilled in the art will understand that event packets can be sent independently from the 'outgoing aggregate packet' 407 to allow rapid distribution of high priority situation information. Such a one will also understand that the transmission of the 'outgoing aggregate packet' 407 can occur on a periodic or semi-periodic basis and that there are many ways to propagate the situation information groups received in the 'incoming aggregate packet' 403 that are equivalent to the disclosed technology. Such a one will also understand how to combine situation information in a packet without attempting to find commonality in the visibility parameters.

Furthermore, such a one will understand that the 'incoming aggregate packet' 403 can represent multiple incoming aggregate packets from, for example, separate source nodes, the same source node through different paths representing the same copy of the information, the same source node representing different packets, etc. The 'visibility filter' 413 can also provide the de-multiplexed situation information to the 'situation information aggregator' 405 separately, as well as providing an aggregate that is to be included within another aggregate.

Figure 5:
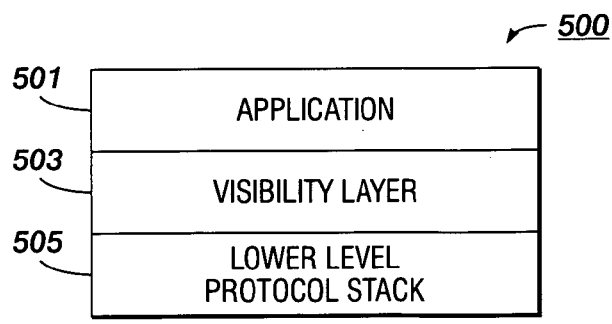
FIG. 5 illustrates a protocol stack indicating location of the visibility layer.

FIG. 5 illustrates a protocol stack 500 that can be used with the technology disclosed herein. At the top of the protocol stack 500 is an application protocol layer 501 that submits situation information for transmission over the network environment and/or processes received situation information. The application protocol layer 501 communicates with a visibility protocol layer 503. The visibility protocol layer 503 can provide the application protocol layer 501 with an interface to directly or indirectly (see the subsequent utility function discussion) set the visibility function parameters for situation information sourced by the node using the protocol stack 500. The visibility protocol layer 503 can also measure or access the neighbor nodal density and adjust the gossip-count responsive to changes in the neighbor nodal density. A lower level communication protocol stack 505 includes protocol layers that are well known in the art.

The sensor information that flows to the 'situation information aggregator' 405 can be processed by the visibility protocol layer 503 to apply visibility parameters directly or indirectly specified by the application protocol layer 501. The visibility protocol layer 503 can provide the application protocol layer 501 with the ability to set visibility parameters responsive to an information utility function (subsequently described).

Figure 6:
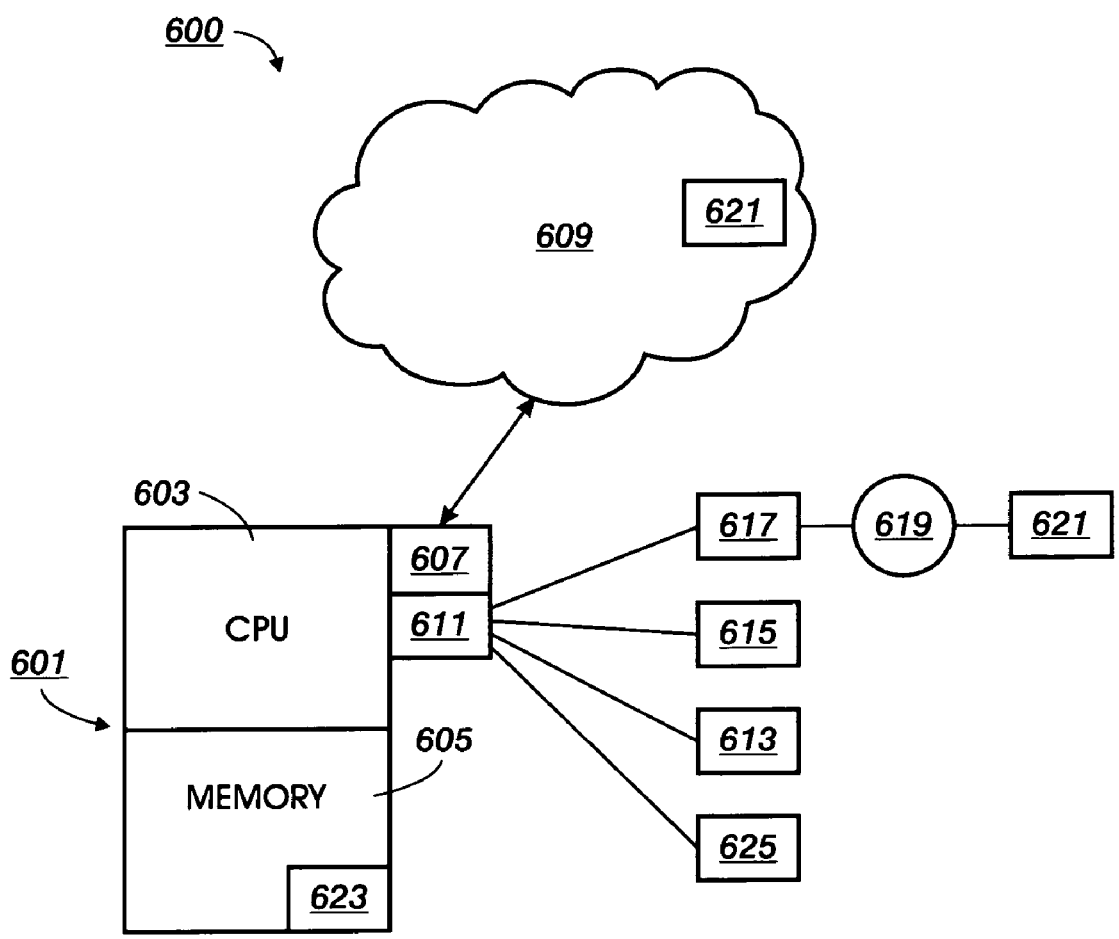
FIG. 6 illustrates a networked computer system in accordance with a preferred embodiment.

FIG. 6 illustrates a networked computer system 600 that can incorporate embodiments of the disclosed technology. The networked computer system 600 includes a computer 601 that incorporates a CPU 603, a memory 605, and a network interface 607. The network interface 607 provides the computer 601 with access to a network 609. The computer 601 also includes an I/O interface 611 that can be connected to a user interface device(s) 613, a storage system 615, and a removable data device 617. The removable data device 617 can read a computer-usable data carrier 619 (such as a ROM within the device, within replaceable ROM, in a computer-usable data carrier such as a memory stick, CD, floppy, DVD or any other tangible media) that typically contains a program product 621. The user interface device(s) 613 can include a display device 625. The storage system 615 (along with the removable data device 617), the computer-usable data carrier 619, and (in some cases the network 609) comprise a file storage mechanism. The program product 621 on the computer-usable data carrier 619 is generally read into the memory 605 as a program 623 which instructs the CPU 603 to perform specified operations. In addition, the program product 621 can be provided from devices accessed using the network 609. One skilled in the art will understand that the network transmits information (such as data that defines a computer program as well as situation information). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted from one point to another. Programs and data are commonly read from both tangible physical media (such as those listed above) and from the network 609. Thus, the network 609, like a tangible physical media, is a computer-usable data carrier. One skilled in the art will understand that not all of the displayed features of the computer 601 need to be present for the all embodiments that implement the techniques disclosed herein. The networked computer system 600 can be installed in a vehicle, a robot, a warehouse, or any other environment where situation information can be distributed, analyzed, and/or received.

Once sufficient additional computational capability exists at the node, other capabilities can be enabled. One of these capabilities is that of aggregating situation information as has been previously described.

A utility function U can be associated with an application (and its situation information) and where $U=U(r,v)$ is a function of distance from source r, as well as the visibility v at the location the information is received. The dependence on r reflects the fact that the value of the received situation information is a function of distance from the source of the situation information; the dependence on v reflects the fact that the resolution profile affects the quality of reconstruction, and therefore the value of the reconstructed information. Utility can also be used to help arbitrate which applications have more "priority" and thus which applications are able to use more of the available network capacity.

The visibility function, $v(r)$, can be designed to maximize the overall utility over the network environment, where the overall utility is the integral over the entire network environment of the utility of the information at each distance r. Each application developer can determine how the value of the situation information used by the application varies by resolution. Based on the value of the application and the value of the situation information, the application developer can determine an information utility function that maximizes the value of the situation information for that particular application (and can, for example, incorporate neighbor nodal densities).

There can be multiple applications each with its own information utility function used to assign value to situation information used by that application. For example, there is a utility value that can be assigned to the knowledge that a particular portion of the roadway is slippery (for example, due to ice, oil, or gravel on the roadway). This utility value can be determined, for example, by considering the cost of accidents due to skids, the benefit of knowing that traffic approaching the slippery section will be slowing down, the benefit of knowing that deliveries may be delayed due to the road conditions, and the benefit of possible detours around the slippery section.

Sensor information from a vehicle traveling over the roadway can include environmental data such as temperature, altitude, and humidity, vehicle state information such as position, speed, and direction; and event data that can indicate that the roadway is slippery (such as activation of a vehicle stability control, anti-lock breaking system, and/or differential slip information).

An inference can be made by considering the number of update packets that contain such event data. If there are a large number of update packets sourced from a particular portion of the roadway (for example from multiple vehicles) that include the above event data, it is highly probable that the roadway is slippery at that particular location. If there are only a few update packets containing such events, there is a lower probability that the roadway is slippery (the slippage cause may be able to be determined by evaluation of the vehicle state data). Because the number of update packets received from the particular location helps determine the probability of the correctness of the inference, the effects of the resolution profile of the visibility function should be accounted for when making the inference from the situation information contained in the update packets. In addition, some nodes can average event information and propagate the averaged information. Averaged information often has higher utility and that utility can be used to devise a visibility function for the averaged information. The combination of averaging and using a different visibility function often reduces network load and increases the overall utility of the received information.

U can also be provided by an application in the application protocol layer 501 to the visibility protocol layer 503 and used to specify or select a visibility function for the situation information handled by that application. Because U is simple to describe and because relevant quantities on either side of the application/visibility interface are related, the visibility function can be analytically related to quantities such as utility and information loss. Thus, the visibility protocol layer 503 can include visibility determination logic that receives utility parameters from the application protocol layer 501 and determines the corresponding visibility function. The visibility function can be constructed such that the optimal U (that maximizes the overall utility) is not affected by a move of a small amount of visibility from one location to another location. That is, the marginal utility remains constant over the resolution profile.

Marginal Utility can also be used to allocate bandwidth between applications. That is, the resource allocation is accomplished such that the marginal utility of each application tends toward being equal with the marginal utility of the other applications. Thus, the bandwidth can be adjusted such that the marginal utility of the applications tend toward being equal. Then the application's individual utility (which drives the applications' visibility function) are adjusted such that the marginal utility for the application is constant over the area of the resolution profile defined by the visibility function.

Figure 7:
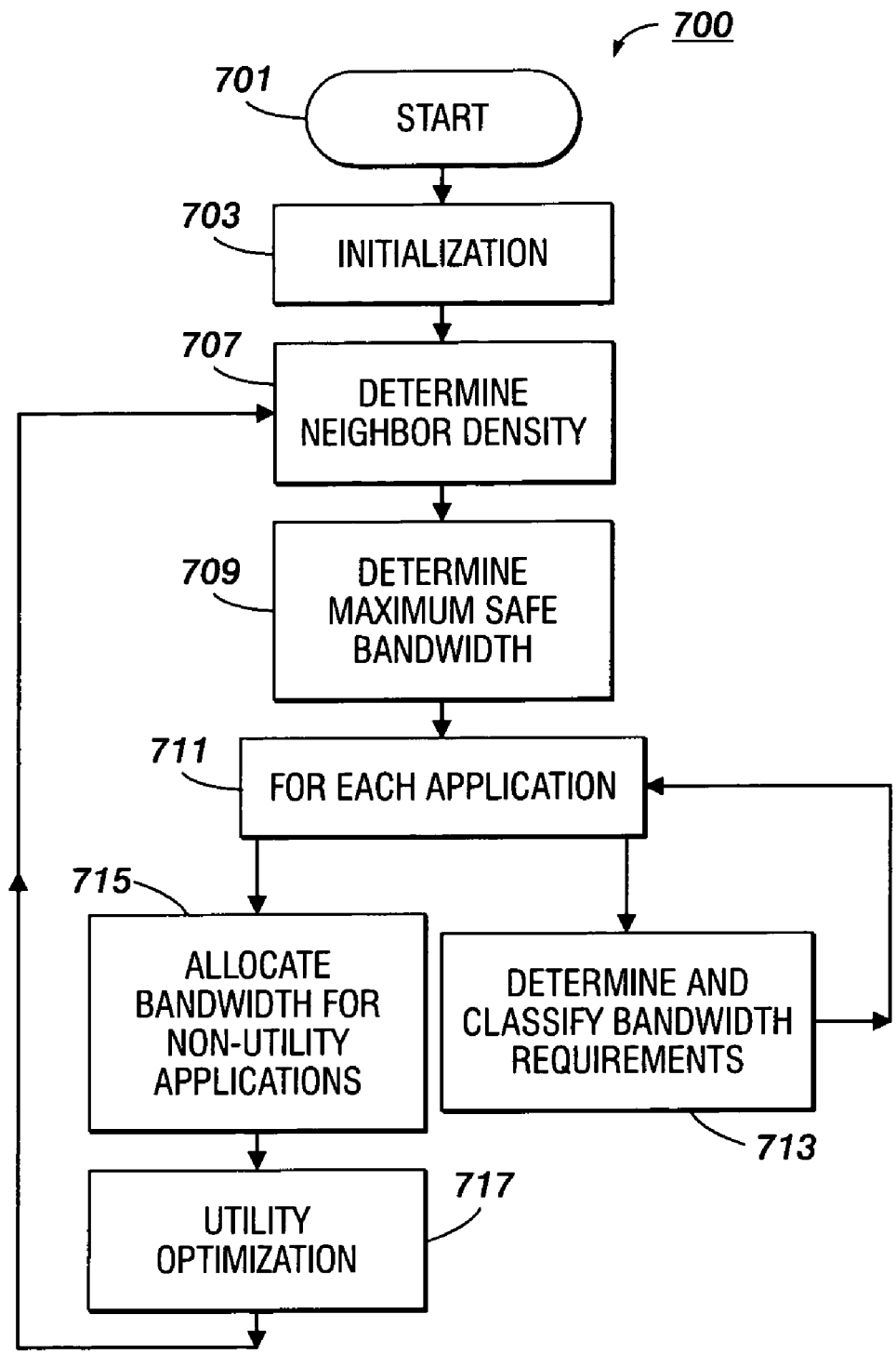
FIG. 7 illustrates a dynamic bandwidth allocation process.

FIG. 7 illustrates a dynamic bandwidth allocation process 700 for a source node that initiates at a start terminal 701 responsive to the application of power or of a reset signal. The dynamic bandwidth allocation process 700 continues to an 'initialization' procedure 703 that performs any required power-on or reset initialization.

Next a 'determine neighbor node density' procedure 707 optionally determines the direct neighbor nodal density (and in some embodiments, includes the near neighbor nodes in the determination of neighbor nodal density) so that if the neighbor nodal density affects utility, the visibility functions corresponding to each application's information utility function can be adjusted for neighbor nodal density (as was previously described). Once the neighbor nodal density is determined (for example, by a nodal density determination logic), a 'determine maximum safe bandwidth' procedure 709 determines the maximum safe bandwidth available to the source node in light of the neighbor nodal density and the network equipment that can be used by the source node. An 'application' iteration procedure 711 then iterates all of the relevant applications at the source node that can use the available bandwidth. As each relevant application is iterated, a 'determine and classify application bandwidth requirements' procedure 713 classifies the application and determines its bandwidth requirements. The classification includes whether or not the application uses an information utility function to determine its visibility function.

Once all the relevant applications are iterated, an 'allocate bandwidth for non-utility-aware applications' procedure 715 reserves a portion of the available bandwidth for use by the utility-based applications, and allocates the remaining bandwidth to the non-utility-based applications.

An 'utility-optimization' procedure 717 then optimizes the utility of each of the information utility functions while also optimizing the utility of all of the information utility functions to achieve an optimal utility for the source node in light of the neighbor nodal density (or any other optimization parameter). One skilled in the art will understand that there exist many possible optimization technologies that can be applied to perform this optimization. Once the optimized utilities are determined, the 'utility-optimization' procedure 717 also establishes visibility functions and/or visibility parameters responsive to each application's optimized information utility function. Once the visibility functions are established, the dynamic bandwidth allocation process 700 returns to the 'determine neighbor node density' procedure 707 to adjust for changes in neighbor nodal density if needed.

The 'utility-optimization' procedure 717 can optimize the marginal utility of the utility-aware applications using, for example, Utility values set by governmental regulation, by the owner of the vehicle, by the operator, or by some combination of these.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic.

One skilled in the art will understand that the network transmits information (such as informational data as well as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

The term "variable-resolution" is intended to apply to any of the distance-dependent resolution characteristics discussed above as well as others explicitly or implicitly discussed herein, and those that become clear to one skilled in the art in light of what is disclosed herein.

While much of what has been discussed herein describes a network environment based on wireless ad hoc network technology, one skilled in the art will also understand that the technology taught herein can also be used with multicast protocols used over a wired network.

One skilled in the art will understand that the technology disclosed above improves the dissemination of information through a portion of, or all of network environment.

From the foregoing, it will be appreciated that the technology has (without limitation) the following advantages:

enables users (and/or applications) to express and specify the global constraints for the potential recipient nodes and also to specify the relative delivery probabilities among the set of potential recipient nodes.

enables applications to treat potential recipient nodes differently unlike existing multicast paradigms.

enables an additional dimension of control in multicast information dissemination. This additional dimension of control is useful in developing applications on wireless ad hoc networks. With VRID one would be able to, for instance, deliver situation information with higher resolution (for example with respect to granularity, precision and/or other resolution characteristics) to near nodes and with lower resolution to far nodes, with only one call to the VRID service.

enables a well-powered sensor environment to aggregate sensor information with received aggregated data to thus minimize bandwidth usage.

Although the present technology has been described in terms of the presently preferred embodiments, one skilled in the art will understand that various modifications and alterations may be made without departing from the scope of the technology. Accordingly, the scope of the technology is not to be limited to the particular technology embodiments discussed herein.

What is claimed follows:

1. A method comprising:
using a visibility function in a network environment, said network environment comprising a plurality of nodes, at least one of said plurality of nodes able to directly transmit to one or more of a subset of said plurality of nodes; said visibility function characterizing a resolution profile within said network environment, said resolution profile extending over at least one node outside said subset of said plurality of nodes, said resolution profile being non-uniform; and
transmitting a first situation information that is conditioned to propagate through said network environment in accordance with said visibility function.

2. The method of claim 1, wherein said resolution profile is responsive to one or more of the group consisting of a distance, an update granularity, a precision, a nodal density, an information utility function, and a 'packet loss' visibility function.

3. The method of claim 1, wherein transmitting said first situation information further comprises transmitting a second situation information in accordance with said visibility function, said first situation information containing a first visibility parameter and said second situation information containing a second visibility parameter, said first visibility parameter comprising a propagation distance component.

4. The method of claim 1, wherein said first situation information comprises event information.

5. The method of claim 1, further comprising adjusting said visibility function responsive to a network characteristic of said network environment.

6. The method of claim 1, further comprising:
receiving said first situation information by a visibility protocol layer from an application protocol layer;
including a visibility parameter, responsive to said visibility function, with said first situation information; and
providing said first visibility parameter and said first situation information to a protocol stack.

7. The method of claim 6, further comprising:
receiving one or more utility parameters by said visibility protocol layer from said application protocol layer; and
determining said visibility function responsive to said one or more utility parameters.

8. The method of claim 7, further comprising: optimizing, both individually and in combination to achieve an optimal utility, a plurality of utility-aware applications with respect to their individual utilities.

9. The method of claim 1, wherein instructions provided by a computer-usable data carrier are capable, if executed by a computer, of causing said computer to perform the method.

10. A method comprising:
receiving a first situation information by one of a plurality of nodes in a network environment, said network environment comprising a plurality of nodes, said first situation information comprising a visibility parameter, said visibility parameter responsive to a visibility function that characterizes a resolution profile within said network environment;
determining, responsive to said visibility parameter, whether said first situation information is eligible for continued propagation through said network environment; and
preparing to transmit said first situation information responsive to the determination that said first situation information is eligible for continued propagation.

11. The method of claim 10, further comprising transmitting said first situation information.

12. The method of claim 10, further comprising providing said first situation information for processing.

13. The method of claim 10, further comprising altering a broadcast storm control parameter responsive to a network characteristic of said network environment to achieve said resolution profile.

14. The method of claim 10, wherein the determination that said first situation information is eligible for continued propagation further comprises:
receiving, by a visibility protocol layer, said first situation information from a protocol stack; and
evaluating said visibility parameter responsive to a network characteristic of a local portion of said network environment.

15. The method of claim 10, further comprising:
transmitting an information probe request, said information probe request comprising a second visibility parameter and a situation information query; and
receiving a query response comprising requested information responsive to said situation information query.

16. The method of claim 10, further comprising:
receiving an information probe request, said information probe request comprising a second visibility parameter and a situation information query; and
transmitting a query response comprising requested information responsive to said situation information query.

17. The method of claim 16, wherein said query response includes said second visibility parameter, a modification of said second visibility parameter, or a transformation of said second visibility parameter.

18. The method of claim 10, further comprising preparing to process said first situation information.

19. The method of claim 10, wherein instructions provided by a computer-usable data carrier are capable, if executed by a computer, of causing said computer to perform the method.

20. An apparatus comprising:
a data source configured to provide a first situation information;
a visibility assignment logic configured to include a visibility parameter with said first situation information provided by the data source, said visibility parameter responsive to a visibility function;

a network interface, responsive to the visibility assignment logic, configured to transmit said first situation information to one or more of a subset of a plurality of nodes in a network environment; and said visibility function characterizing a resolution profile within said network environment, said resolution profile being non-uniform and extending over at least one node outside said subset of said plurality of nodes.

21. The apparatus of claim 20, wherein said resolution profile is responsive to one or more of the group consisting of a distance, an update granularity, a precision, a nodal density, an information utility function, and a 'packet loss' visibility function.

22. The apparatus of claim 20, wherein the data source is also configured to provide a second situation information, the visibility assignment logic is also configured to include a second visibility parameter with said second situation information, and wherein said visibility parameter comprises a propagation distance component.

23. The apparatus of claim 20, wherein said first situation information comprises event information.

24. The apparatus of claim 20, further comprising a visibility adjustment logic configured to adjust said visibility function responsive to a network characteristic of said network environment.

25. The apparatus of claim 24, further comprising: an optimization logic, responsive to the nodal density determination logic, configured to achieve an optimal utility by optimizing a plurality of utility-aware applications with respect to their individual utilities both individually and in combination.

26. The apparatus of claim 20, further comprising:
a visibility protocol stack comprising:
an application protocol layer;
a visibility protocol layer configured to receive said first situation information from the application protocol layer and to include a visibility parameter, responsive to said visibility function, with said first situation information; and
a protocol stack configured to receive said first situation information with said visibility parameter from the visibility protocol layer.

27. The apparatus of claim 26, further comprising:
a visibility determination logic configured to receive one or more utility parameters from the application protocol layer and to determine said visibility function responsive to said one or more utility parameters.

28. An apparatus comprising:
a receiver configured to receive a first situation information from one of a plurality of nodes in a network environment, said network environment comprising a plurality of nodes, said first situation information comprising a visibility parameter, said visibility parameter responsive to a visibility function that characterizes a resolution profile within said network environment;
a decision logic configured to determine, responsive to said visibility parameter, whether said first situation information is eligible for continued propagation through said network environment; and
a transmission preparation logic configured to prepare said first situation information for transmission responsive to the decision logic.

29. The apparatus of claim 28, further comprising a network interface, responsive to the transmission preparation logic, configured to transmit said first situation information to the network environment.

30. The apparatus of claim 28, further comprising data processing logic configured to process said first situation information.

31. The apparatus of claim 28, further comprising an anti-storm adjustment logic configured to alter a broadcast storm control parameter responsive to said visibility parameter.

32. The apparatus of claim 28, wherein the decision logic further comprises:
a visibility protocol layer configured to receive said first situation information from a protocol stack; and
an retransmission evaluation logic configured to evaluate said visibility parameter responsive to a network characteristic of a local portion of said network environment.

33. The apparatus of claim 28, further comprising:
an information query logic configured to transmit an information probe request, said information probe request comprising a second visibility parameter and a situation information query; and
an information query processing logic configured to process a query response comprising requested information responsive to said situation information query.

34. The apparatus of claim 28, further comprising:
an information query receipt logic configured to receive an information probe request, said information probe request comprising a second visibility parameter and a situation information query; and
an information query response logic configured to transmit a query response comprising requested information responsive to said situation information query.

35. The apparatus of claim 34, wherein said query response includes said second visibility parameter, a modification of said second visibility parameter, or a transformation of said second visibility parameter.

36. The apparatus of claim 28, further comprising data processing logic configured to process said first situation information.

37. The apparatus of claim 36, wherein the apparatus is a component of a vehicle, a robot, or a warehouse.

* * * * *